…

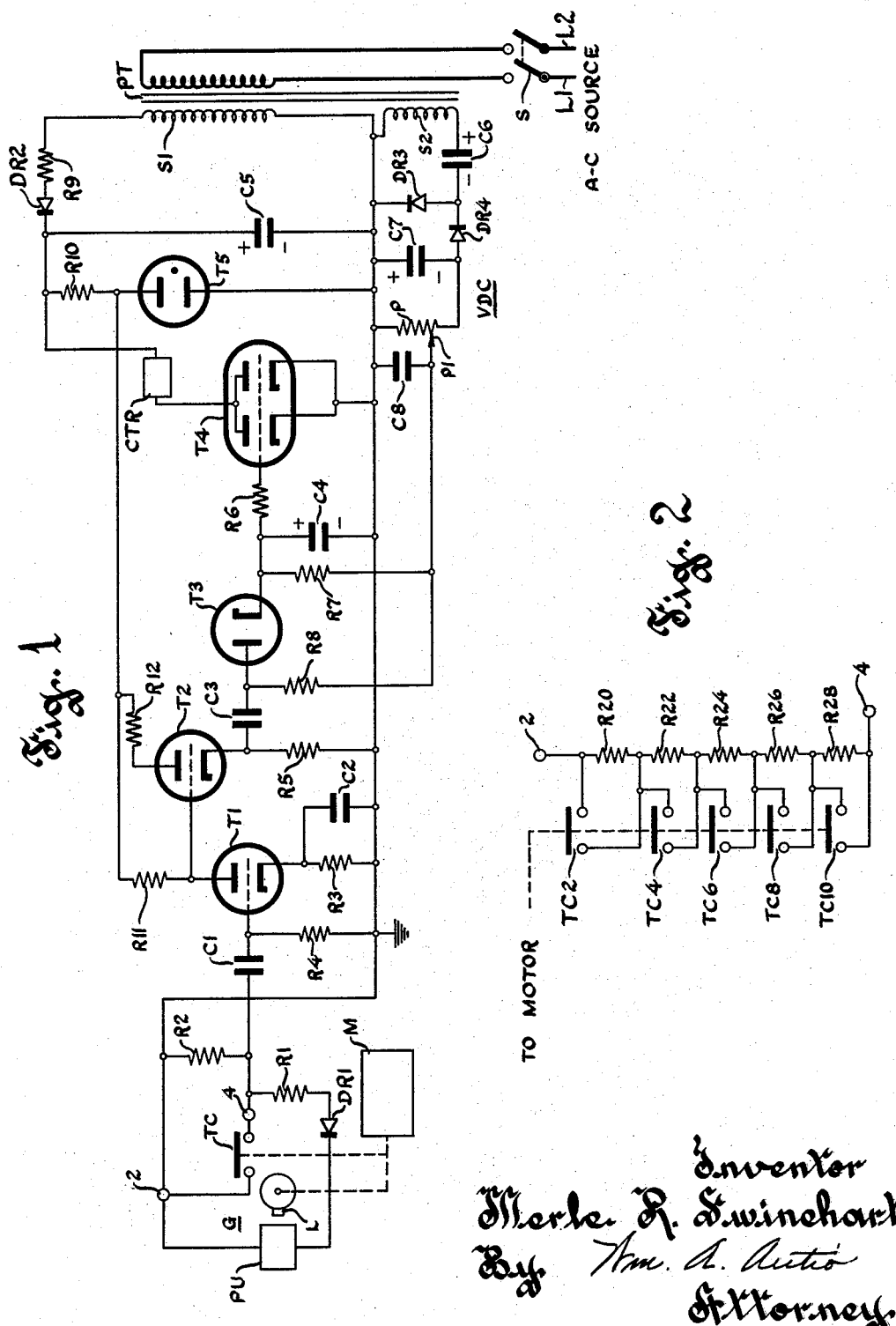

United States Patent Office 3,128,426
Patented Apr. 7, 1964

3,128,426
MEANS FOR ELECTRICAL TESTING OF THE EFFECTIVENESS OF CLOSURE OF ELECTRICAL CONTACTS
Merle R. Swinehart, Brookfield, Wis., assignor to Cutler-Hammer Inc., Milwaukee, Wis., a corporation of Delaware
Filed Sept. 4, 1959, Ser. No. 838,111
16 Claims. (Cl. 324—28)

This invention relates to methods of and means for electrical testing and more particularly to methods of and means for testing the operation of electrical contacts.

While not limited thereto, the invention is especially applicable to testing the effectiveness of closure of electrical contacts and to indicating the failure of such contacts to properly complete an electrical circuit upon closure thereof. More particularly, the invention is especially applicable to testing of electrical contacts of the "dry circuit" type. For the purposes of this invention, "dry circuit" is defined as an electrical circuit in which the voltage and impedance have such values that, upon closing or opening the circuit, a gaseous electrical discharge does not occur at the contact surfaces. Such "dry circuit" conditions exist at very low voltages, that is, when the value of voltage that is applied across the contacts does not exceed the breakdown voltage of the surface films of the contacts, such films not being thin enough to conduct by the tunnel effect. The phenomenon known as tunnel effect is a penetration by electrons of a potential hill between the plane faces of contacts of the same metal more fully described in Appendix III of Ragnar Holm's Electric Contacts Handbook. It may be assumed that the circuit does not become "drier" if the voltage is decreased below such value of voltage.

It has been recognized that the most severe test condition occurs when the contacts are opened and closed without test voltage being applied and, therefore, without current flow therethrough; that is, the test voltage is applied and current flow initiated and terminated while the contacts are in the closed condition. Systems known heretofore employed an auxiliary set of contacts for connecting the test voltage to the contacts under test. These prior systems had the disadvantage that such auxiliary contacts were subject to failure to close the circuit and, therefore, introduced a question as to the reliability of the auxiliary contacts to properly complete the circuit. Therefore, it has been found desirable to devise a testing system capable of applying the test voltage without the use of auxiliary contacts.

A general object of the invention is to provide an improved testing system.

A more specific object of the invention is to provide improved means for testing electrical contacts.

Another specific object of the invention is to provide improved means for testing the effectiveness of closure of electrical contacts and for indicating a failure of such contacts to properly close an electrical circuit due to resistive surface films on the contacts.

Another specific object of the invention is to provide a contact testing system with improved means for applying the test voltage to the contacts under test which is efficient and reliable and not subject to failure.

Another specific object of the invention is to provide improved means for testing the closure of electrical contacts of the "dry circuit" or very low voltage type wherein the test voltage is applied without the use of auxiliary contacts or the like thereby to eliminate operational error in the test circuit.

Other objects and advantages of the invention will hereinafter appear.

While the apparatus hereinafter described is effectively adapted to fulfill the objects stated, I do not intend to confine my invention to the particular preferred embodiments of testing systems disclosed inasmuch as they are susceptible of various modifications without departing from the scope of the appended claims.

The invention will now be described in detail with reference to the accompanying drawings wherein:

FIGURE 1 is a diagrammatic illustration of a testing system constructed in accordance with the invention; and FIG. 2 is a fragmentary diagram showing a modification of FIG. 1 for testing a plurality of contacts.

Referring to FIG. 1, there is shown a testing system for testing a contact TC which may have a single point of closure or may be of the bridging type shown. A voltage generator G for supplying the test voltage is connected in series with a resistor R1 and a rectifier DR1 across test contact TC. Voltage generator G is of a known type and consists of a magnetic pickup PU permanently connected to the test contact and a movable steel lug L. Pickup PU may be similar to the Electro Products Laboratories new magnetic pickup impulse generator having a permanent magnet energizing a pole piece surrounded by a coil of wire. The pickup generates a voltage pulse when its external magnetic field is distorted by the motion of a metallic member subject to magnetization such as ordinary steel or iron machine components. For a more detailed description of such pickup, reference may be had to B. R. Kamler et al., United States Patent No. 2,396,703, dated March 19, 1946. The voltage generator G generates a voltage pulse each time steel lug L is swung past the magnetic pickup. As indicated by the broken lines, rotary lug L and test contact TC are mechanically operated in synchronism by an actuator such as a motor M or the like. A resistor R2 is connected across test contact TC, resistors R1 and R2 forming a voltage divider circuit. The value of resistor R1 is substantially larger than the value of resistor R2 and the ratio thereof is selected (of the order of 300 to 1) so that the current is essentially constant regardless of the value of contact resistance on contact TC. The positive side of resistor R2 is connected to ground and through a resistor R3 to the cathode of an amplifying electric discharge device T1. The junction between resistors R1 and R2 is connected through a coupling capacitor C1 to the control grid of electric discharge device T1. The control grid of electric discharge device T1 is connected through a grid resistor R4 to ground. A capacitor C2 is connected in parallel with cathode resistor R3 to form a grid-bias filter for applying negative bias to the control grid of discharge device T1 in a manner well known. The output of electric discharge device T1 is connected to the input of a cathode follower type electric discharge device T2. To this end, the anode of discharge device T1 is connected directly to the control grid of discharge device T2. The cathode of discharge device T2 is connected through a resistor R5 to ground. The output of discharge device T2 is connected to the input of a power amplifier double triode electric discharge device T4. To this end, the cathode of electric discharge device T2 is connected through a coupling capacitor C3 to the anode of a rectifying diode T3, the cathode of the latter being connected through a resistor R6 to the control grids of double triode discharge device T4. The cathode of diode T3 is also connected through a capacitor C4 to ground and through a resistor R7 to a voltage doubler circuit VDC hereinafter described. The junction between capacitor C3 and the anode of diode T3 is connected through a resistor R8 to the voltage doubler circuit. The two cathodes of double triode T4 are connected to ground.

Electric discharge devices T1, T2 and T4 are supplied with unidirectional anode voltage from an alternating current power supply source shown at the right hand portion of FIG. 1. This power supply source is connected through lines L1 and L2 and a double pole power supply switch S across the primary winding of a power transformer PT. Secondary winding S1 of power transformer PT is connected through a resistor R9 and a rectifier DR2 across a filter capacitor C5. A voltage regulating circuit consisting of a resistor R10 in series connection with an electric discharge device T5, such as a gaseous diode or the like, is connected across filter capacitor C5. The junction between capacitor C5 and diode T5 is connected to ground. The junction between rectifier DR2 and resistor R10 is connected through the energizing coil of a counter CTR to the anodes of double triode T4. The junction between resistor R10 and diode T5 in the voltage regulating circuit is connected through a resistor R11 to the anode of discharge device T1 and through a resistor R12 to the anode of discharge device T2.

The voltage doubler circuit VDC is supplied from secondary winding S2 of power transformer PT. This circuit is provided with a capacitor C6 and a rectifier DR3 connected in series across secondary winding S2, the junction between rectifier DR3 and the upper end of secondary winding S2 being connected to the cathodes of discharge device T4. A capacitor C7 and a rectifier DR4 are connected in series across rectifier DR3 between the cathodes of discharge device T4 and the junction between rectifier DR3 and capacitor C6. The resistor element of a potentiometer P is connected across capacitor C7. Potentiometer P is provided with a movable tap P1 directly connected to resistors R7 and R8. A filter capacitor C8 is connected between the cathodes of discharge device T4 and movable tap P1 of potentiometer P.

At the left hand portion of FIG. 1, terminals 2 and 4 are provided for connecting test contact TC to the testing system.

Referring to FIG. 2, there is shown a fragmentary circuit for modifying the testing system of FIG. 1 in order to test a plurality of contacts simultaneously. The circuit shown in FIG. 2 may be connected in place of test contact TC of FIG. 1 at terminals 2 and 4. This circuit is provided with a plurality of resistors R20, R22, R24, R26 and R28 connected in series across terminals 2 and 4. Test contacts TC2, TC4, TC6, TC8 and TC10 which are arranged for simultaneous operation by an actuator such as motor M of FIG. 1 are connected across the respective resistors R20 through R28.

The operation of the testing system will now be described. Let it be assumed that power supply switch S is closed to apply anode supply voltage to the electric discharge devices of the system. Closure of switch S connects alternating current power across the primary winding of transformer PT. The voltage appearing across secondary winding S1 is applied through current limiting resistor R9 and rectifier DR2 across capacitor C5. As a result, current flows in the circuit of secondary winding S1 which current is rectified to charge capacitor C5 in the direction indicated by the positive and negative signs. The rectified voltage appearing across capacitor C5 is applied across the voltage regulator circuit consisting of resistor R10 and diode T5. This voltage is also applied across the operating coil of counter CTR in series with the anodes and cathodes of double triode discharge device T4. A double triode discharge device T4 is employed to afford sufficient current to operate counter CTR. The regulated voltage appearing across voltage regulating diode T5 is applied across resistor R11, the anode and cathode of discharge device T1 and resistor R3 in series. This regulated voltage is also applied across resistor R12, the anode and cathode of discharge device T2 and resistor R5 in series. The voltage regulator comprising resistor R10 and diode T5 is of a well known type. The voltage across diode T5 remains substantially constant. Any variation in current flow through resistor R10 and diode T5 in response to a variation in voltage across capacitor C5 causes a corresponding variation in the voltage drop across resistor R10. Thus, the voltage across diode T5 remains substantially constant to supply constant regulated anode voltage to electrical discharge devices T1 and T2.

Secondary winding S2 of transformer PT is normally employed to supply filament voltage to the electrical discharge devices in a manner well known. Because of the small magnitude of the voltage appearing across secondary winding S2 of transformer PT, voltage doubler circuit VDC may conveniently be energized therefrom to supply adjustable negative bias voltage to the control grids of power amplifier discharge device T4. A rectified current flows from the lower end of secondary winding S2 through capacitor C6 and rectifier DR3 to the upper end of the secondary winding to charge capacitor C6 in the direction indicated by the positive and negative signs. On each alternate half cycle of the alternating current source, a current flows from the upper end of secondary winding S2 through capacitor C7 and rectifier DR4 and capacitor C6 to the lower end of the secondary winding. During each such alternate half cycle, the last mentioned circuit has in effect two supply sources, one being secondary winding S2 and the other being charged capacitor C6 in series therewith. As a result, capacitor C7 is charged to double voltage and such voltage is applied across the resistor element of potentiometer P. An adjustable portion of the voltage across the resistor element of potentiometer P is applied from tap P1 through resistors R7 and R6 to the control grids of double triode discharge device T4 to negatively bias the latter to cutoff, this bias voltage being filtered by capacitor C8. The resistance values of resistors R7 and R8 afford discharge paths for capacitors C3 and C4 as hereinafter described.

The voltage applied from regulating diode T5 through resistor R11 to the anode of discharge device T1 renders the latter conducting. As will be apparent, discharge device T1 is of the self-biased type and will continue to conduct in the absence of an input control voltage although the cathode voltage is above the ground voltage of the control grid as current flows through resistor R3. The voltage applied from the anode of discharge device T1 to the control grid of discharge device T2 renders the latter conducting. However, the current flow through discharge device T2 is limited by resistor R12 so that the output from the cathode thereof is limited so that excessive positive voltages cannot be applied to the following circuits.

It has been determined that there is a critical contact test voltage which may be employed in surface film resistance measurements. This test voltage must be low enough so that contact surface films are not damaged by the test current. It may be assumed that breakdown of surface films does not occur below 10 millivolts. Then if the contact resistance is measured without exceeding 5 millivolts thereacross it may be assumed that the resultant resistance value is valid for all lower voltages.

It having been determined that the voltage across the test contacts is to be limited to 5 millivolts maximum, it becomes necessary to determine what value of contact resistance shall be considered as unreliable or as a failure of the contacts to properly complete the circuit. In certain instruments and control circuits, contacts resistance of the order of 200 ohms may cause trouble. To adequately test such contacts, it was found desirable to operate the counter whenever the contact resistance exceeds 50 ohms. To this end, resistor R2 which is connected in parallel with test contact TC was given a value of 220 ohms and resistor R1 which is connected in series with the contact was given a value of 68,000 ohms, rectifier DR1 and pickup PU also being in series with the contact. The air gap on the voltage generator may then be adjusted to adjust the test current so that the test contact open circuit voltage is limited to 5 millivolts maximum. This affords a test current which is essentially constant at $23 \times 10^{-6}$ amperes regardless of the value of contact resistance. With a contact resistance of 50 ohms, the parallel combination thereof with resistor R2 affords a resistance of 40.8 ohms. The aforementioned current flow therethrough affords a voltage drop of 0.94 millivolt across the test contacts. The testing system may then be adjusted to operate counter CTR whenever the voltage across the test contacts exceeds 0.94 millivolt.

The system is adjusted for a given testing operation in the following manner. The test contacts are replaced by a resistor of a first value representative of the contact resistance at which the counter is desired to operate following which the test contacts are replaced by a resistor of a lower value representative of the contact resistance at which the counter is desired not to operate. Adjustment is then made at tap P1 of potentiometer P or by changing the air gap on the magnetic pickup of generator G to decrease the test current so that the counter will operate when the first value of resistance is in circuit and will not operate when the second lower value of resistance is in circuit. To afford operation of counter CTR in response to a 0.94 millivolt input voltage pulse, additional preamplifier stages, not shown, may be inserted between the test circuit and amplifying discharge device T1, that is, between resistor R2 and capacitor C1.

The system is capable of discriminating between a contact resistance of 56 ohms and one of 39 ohms, for example. Thus, resistors of these values may be employed in place of the test contacts for the purpose of adjusting the system as aforementioned.

The system is now ready for a testing operation. When motor M is started, it operates to periodically close and open test contact TC. Motor M also acts to swing steel lug L past magnetic pickup PU of generator G to apply a rectified voltage across test contact TC each time the contact is closed. The resistance values of resistors R1 and R2 of the voltage divider are selected as aforementioned so that an operating signal voltage is transmitted each time test contact TC fails to close properly. Such resistance values are selected so that an operating signal is produced if the voltage drop across contact TC, when closed, is at or above a predetermined value. If the voltage drop across contact TC is below such predetermined value, the operating signal that is produced is insufficient to operate counter CTR. For example, it has been assumed that the voltage drop across contact TC, when open, is limited to 5 millivolts. It has also been assumed that contact TC has failed to close properly if the voltage drop thereacross, when closed, is more than 0.94 millivolt and that the contact has properly closed if the voltage drop thereacross, when closed, is less than 0.94 millivolt. When the voltage drop across the test contacts is less than the predetermined amount selected, it is insufficient to render electric discharge device T4 conducting. Each time the test contact fails to close effectively, a negative voltage equal to the voltage drop across contact TC is supplied through capacitor C1 to the control grid of discharge device T1. This negative voltage pulse on the control grid of discharge device T1 causes a decrease in conduction through the latter and, consequently, causes the voltage at the anode of the latter to increase. This increase in voltage is applied directly to the control grid of discharge device T2 to enhance the conduction of the latter. The output of discharge device T2 appears as a voltage drop across cathode resistor R5 and is proportional to the amplified voltage change at the anode of discharge device T1. This output voltage is applied through capacitor C3, diode T3 and resistor R6 to the control grids of double triode discharge device T4 to counteract the negative bias thereon and to render the same conducting. Also capacitor C4 charges in a circuit extending from the upper end of resistor R5 through capacitor C3, diode T3 and capacitor C4 to the lower end of resistor R5. The charge on capacitor C4 maintains a positive voltage on the control grids of discharge device T4 long enough to enable counter CTR to operate.

Diode T3 forms with discharge device T4 a voltage discriminator. Thus, diode T3 will conduct to enable discharge device T4 to operate the counter when a voltage of predetermined value is received but will not enable discharge device T4 to operate the counter when a voltage less than such predetermined value is received. Diode T3 isolates the control grid circuit of discharge device T4 from the cathode of discharge device T2 each time when the voltage of the latter decreases. A discharge path for capacitor C4 extends through resistor R7 and tap P1 and the upper portion of the resistor element of potentiometer P. A discharge path for capacitor C3 extends through resistor R5, the upper portion of the resistor element of potentiometer P and tap P1 and resistor R8.

The system shown in FIG. 1 may be employed to test the contacts of a plural-contact relay or switch when the circuit shown in FIG. 2 is connected to terminals 2 and 4 in place of contact TC of FIG. 1. As shown in FIG. 2, each contact TC2, TC4, TC6, TC8 and TC10 is provided with a resistor connected thereacross to prevent the accumulation of static charges on the contacts which might cause an erroneous indication when the contacts close. As indicated by the broken line, contacts TC2 through TC10 are mechanically connected for simultaneous operation by motor M in synchronism with the operation of voltage generator G. The failure of any one or more contacts to close properly is registered on counter CTR. Each time the contacts close, generator G applies a test voltage pulse thereacross. If the voltage drop across any one or more contacts is over a predetermined value, the voltage discriminator responds to operate counter CTR as hereinbefore described. Thus, the system of FIG. 1 when modified in accordance with FIG. 2 is operable to test the reliability of a plural-contact switch and to register the number of failures that occur among the contacts thereof.

The total number of times the contacts of FIG. 1 or FIG. 2 close for a given test is readily determined by the speed of testing and running time, that is, by the revolutions a minute of the motor or contact operating mechanism. The counter indicates the number of failures for such total number of contact operations.

The value of contact resistance which constitutes a failure and which causes the counter to operate can be adjusted by changing the value of test current by changing the values of resistors R1 and R2, keeping the ratio thereof constant. The amount that the test current can be increased is limited only by the impedance of the magnetic pickup of the voltage generator.

I claim:

1. In a system for testing the effectiveness of a contact to efficiently close an electrical circuit, in combination, a test circuit, a test contact in said circuit for closing the latter when said contact is closed, voltage generating means connected in said circuit for applying a test voltage across said contact, said voltage generating means being ineffective when said contact is open so that it does not generate a voltage, means for closing said contact, means operating in synchronism with said contact closing means for rendering said voltage generating means effective to generate a test voltage across said contact one after said contact is closed, failure of said contact to efficiently complete a conductive path therethrough causing a voltage to appear across said contact when said test voltage is generated, and means responsive to said voltage across said contact when it is above a predetermined value for indicating said failure.

2. In a system for testing a plurality of electrical contacts, in combination, a test circuit, means connecting said contacts in series in said test circuit to close the latter when said contacts are closed, means for closing said contacts simultaneously, voltage generating means connected in said test circuit for generating a test voltage across said contacts, the contacts under test being the sole means for closing said test circuit whereby no other contact resistance error is introduced therein, said voltage generating means being ineffective when the contacts under test are open so that no voltage is generated thereby, and means operable in synchronism with said contact closing means for rendering said voltage generating means effective to generate said test voltage across said contacts after the latter are closed.

3. The invention defined in claim 2, together with means for discriminating between different values of contact resistance in said contact, and indicating means responsive to said discriminating means when the contact resistance is above a predetermined value.

4. The invention defined in claim 2, together with registering means operable when the contact resistance is in a predetermined range, and means responsive to the voltage across said contact for operating said registering means.

5. In a system for testing an electrical contact having means for closing the contact, means for applying a voltage across the contact when closed, and means responsive to the voltage drop across the contact to indicate the value of contact resistance, the improvement comprising a voltage generator connected in circuit with the contact, the contact under test being the sole means for closing the circuit through the voltage generator when the contact is closed, said voltage generator being ineffective when said contact is open so that it does not generate any voltage, and an actuator for closing the contact and for rendering said voltage generator effective to generate a test voltage across the contact after the latter is closed.

6. The invention defined in claim 5, wherein said actuator comprises a motor having a first driven mechanism for repeatedly closing and opening the contact and a second driven mechanism for rendering said voltage generator operative to generate a voltage pulse each time the contact is closed and immediately after such closure of the contact.

7. In a system for counting the number of times the contact resistance upon closure is above a predetermined value for a given number of contact closures at dry circuit or very low voltage conditions, in combination, a voltage generator and a unidirectional conducting device connected in series circuit across the contact whereby the contact when closed constitutes the sole means for closing said series circuit, a voltage divider comprising a first resistor of large value connected in said series circuit and a second resistor of relatively smaller value connected in parallel with the contact, means for adjusting said voltage generator so that the voltage across the contact has a predetermined low value not exceeding the breakdown voltage of the surface films of the contact, an actuator for cyclically operating the contact and for operating said voltage generator in synchronism therewith to apply a test voltage pulse to said series circuit following each closure of the contact, a counter, and means comprising a voltage discriminator responsive to the voltage drop across the contact whenever the contact resistance upon closure thereof is above a predetermined value for operating said counter, the voltage drop across the contact being insufficient to cause said discriminator to operate said counter whenever said contact resistance is below said predetermined value.

8. The invention defined in claim 7, wherein said first and second resistors in said voltage divider are provided with predetermined relative values such that the current in said voltage generator circuit caused to flow by each voltage pulse has essentially the same value regardless of the value of contact resistance.

9. The invention defined in claim 7, wherein the last mentioned means further comprises amplifying means connected to the test contact for operating said discriminator, and a power amplifier connected to operate said counter, and means for adjusting said power amplifier to operate said counter when said contact resistance is above said predetermined value.

10. The invention defined in claim 7, wherein said unidirectional conducting device is poled to afford a negative control voltage from the contact to operate said amplifying means.

11. In a system for testing the effectiveness of electrical contact closure, a testing circuit comprising a voltage generating means and the contact under test connected therein, means for operating said contact to close and open said circuit and said circuit except for said contact when open forming a continuous electrically conductive path through said voltage generating means, said voltage generating means having a no-output-voltage condition wherein no test voltage is generated therein and being operable from said condition to a condition wherein a test voltage is generated and applied across said contact, and means operable with said contact operating means for rendering said voltage generating means operative to generate a voltage and to apply a test voltage across said contact only after said contact is in its closed condition.

12. In a system for testing the effectiveness of closure of electrical contact means under dry circuit conditions, in combination:
   a voltage producer comprising first means in which a voltage may be produced and second means operable to produce a voltage in said first means;
   said first means comprising a continuous electrically conductive path therethrough;
   means connecting the contact means under test to the continuous electrically conductive path of said first means to provide a continuous circuit which can be closed and reopened by the contact means under test;
   means for operating the contact means under test and said second means in synchronism with one another to cause closure of the contact means under test while no voltage is being produced and to cause production of a voltage in said first means only after such closure;
   and electroresponsive means connected to said contact means under test for indicating the effectiveness of closure thereof.

13. In a system for testing the effectiveness of closure of electrical contact means, in combination:
   a voltage generator comprising first means in which a voltage may be produced and second means operable to produce a voltage periodically in said first means;
   said first means comprising a continuous electrically conductive path therethrough;
   means connecting the contact means under test of the continuous electrically conductive path of said first means to provide a continuous circuit which can be closed and reopened by the contact means under test;
   means for operating the contact means under test and said second means in synchronism with one another to cause periodic and repetitive closures of the contact means under test while no voltage is being produced and to cause respectively periodic and repetitive productions of a voltage in said first means only after each such closure;
   and electroresponsive means connected to said contact means under test for registering the inffective closures of said contact means.

14. The invention defined in claim 13, wherein said electroresponsive registering means comprises:
   means for detecting ineffective closures of said contact means by responding to the voltage thereacross when it is above a predetermined value;
   and counting means responsive to each operation of said detecting means whereby the registration in said counting means indicates the number of times said contact means fails to complete an effective circuit for the total number of contact closures.

15. The invention defined in claim 13, wherein said means for operating the contact means under test and said second means in synchronism with one another comprises:

means synchronising the closure and reopening of said contact means with said voltage producing means so that the voltage is produced after closure of the contact means and the voltage is terminated before reopening of said contact means.

16. In a system for testing the effectiveness of closure of electrical contact means wherein a test voltage is applied across the electrical contact means under test and electroresponsive means are provided to indicate the ineffectiveness of such closure when the voltage appearing across the closed contact means has a magnitude above a predetermined value, the improvement comprising:

means for subjecting the contact means to a severe test by closing the contact means while a test voltage is not being applied thereto and for applying the test voltage only under static conditions after the contact has been closed; said means comprising:

voltage pulse producing means comprising a first device in which a voltage pulse is produced and having an electrically conductive path therethrough and a second device operable to produce a voltage pulse in said first device;

means connecting the electrically conductive path of said first device to the contact means under test to provide a loop circuit wherein the sole contact resistance is introduced by the contact means under test;

and means for operating the contact means under test and for operating said second device in synchronism with the operation of said contact means to cause production of a voltage pulse in said first device only after closure of said contact means.

References Cited in the file of this patent
UNITED STATES PATENTS

| | | |
|---|---|---|
| 2,120,873 | Skeats | June 14, 1938 |
| 2,444,014 | Williams | June 22, 1948 |
| 2,832,038 | Gordon | Apr. 22, 1958 |
| 2,833,983 | Shaw | May 6, 1958 |